United States Patent [19]

Salesse et al.

[11] 4,247,036
[45] Jan. 27, 1981

[54] PROCESS FOR ASSEMBLING ALUMINUM-BASED MEMBERS AND STEEL MEMBERS

[75] Inventors: Marc Salesse, Meylan; Dominique Klein, Ham, both of France

[73] Assignee: Societe de Vente de l'Aluminium Pechiney, Paris, France

[21] Appl. No.: 962,685

[22] Filed: Nov. 21, 1978

[30] Foreign Application Priority Data

Dec. 7, 1977 [FR] France .................. 77 37751

[51] Int. Cl.³ .............. B23K 19/00; B23K 35/365; B23K 35/30
[52] U.S. Cl. .................. 228/194; 228/195; 228/208; 428/641; 75/208 R
[58] Field of Search ............. 228/193, 194, 195, 208, 228/243, 117, 235; 75/208 R; 428/653, 641

[56] References Cited

U.S. PATENT DOCUMENTS

| | | | |
|---|---|---|---|
| 3,419,388 | 12/1968 | Arutunian | 75/208 R |
| 3,482,305 | 12/1969 | Dockus et al. | 228/194 |
| 3,551,122 | 12/1970 | Gulla | 428/641 |
| 3,716,347 | 2/1973 | Bergstrom et al. | 75/208 R |
| 3,717,442 | 2/1973 | Knopp | 75/208 R |
| 4,046,305 | 9/1977 | Brown et al. | 228/194 |

FOREIGN PATENT DOCUMENTS 719404 10/1965 Canada .................. 428/641

*Primary Examiner*—Daniel C. Crane
*Attorney, Agent, or Firm*—Dennison, Dennison, Meserole & Pollack

[57] ABSTRACT

The invention concerns a process for assembling aluminum-based members and steel members.

This process is characterized by:
  covering the steel member with a metal film on the part of the surface to be assembled,
  disposing grains of silicon at the aluminium-steel interface,
  providing protection from oxidation for the faces to be assembled,
  heating the members so as to achieve an interface temeperature of from 500° C. to 650° C. and applying a pressure which is sufficient to totally or partially expel the liquid eutectic which is thus formed,
  cooling the assembly.

The assembly which is produced in this way is used in particular in so-called 'clad' connecting members for igneous electrolysis vessels, in armour plating requiring high mechanical strength and in all cases where connections are to be made, which have good electrical and mechanical properties, for continuous use in a temperature range from at least −200° C. to at least +450° C.

16 Claims, 1 Drawing Figure

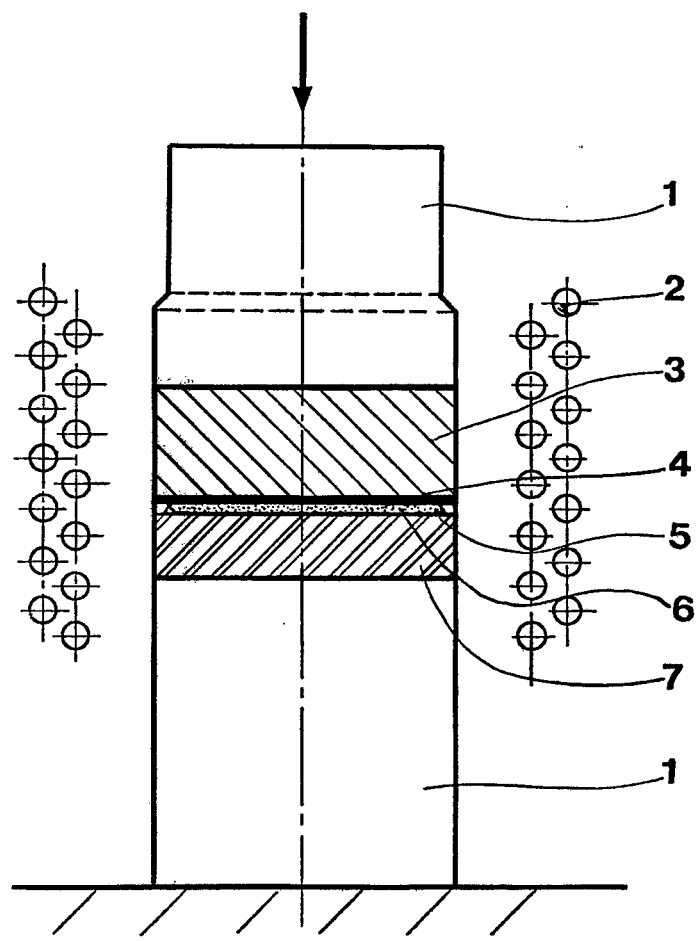

PROCESS FOR ASSEMBLING ALUMINUM-BASED MEMBERS AND STEEL MEMBERS

The present invention relates to a process for the assembly by hot pressing of aluminium-based members and iron-based members, both of which kinds of members may be in various forms such as for example plates, bars, sheets, discs, rods, bosses, etc. It covers on the one hand the members which comprise either aluminium of current or refined quality, or alloys which are formed with said metal, and on the other hand members which are made either of iron or of one of its derivatives, whether it be cast iron or steel which may or may not be alloyed with other metals. Hereinafter in this specification, we shall use the term 'steel' to refer generally to iron and derivatives thereof.

The assembly process comprises securing the members together by forming a continuity between one or more of their faces so as to produce an assembly which has good mechanical strength and low electrical resistance.

The man skilled in the art is aware of numerous processes for assembling aluminium-based members and steel members.

The simplest of such processes comprises connecting the members together by purely mechanical means such as screws, nuts and bolts, or rivets.

Other processes employ more complicated techniques such as:

brazing, which comprises melting between the members to be assembled, a metal or an alloy which has a lower melting point than the melting point of the members to be joined;

welding with an oxyacetylene torch or under a protective gas, this being a process in which at least one of the members to be joined is caused to melt;

friction welding in which the heat required for fusion is supplied by frictional energy;

ultrasonic welding in which welding is caused by the simultaneous action of a pressure and ultrasonic energy;

plating by rolling in which the connection between the members is produced by means of the pressure and deformation applied by the cylinders of rolling mills;

plating by explosion which employs the effect of the pressure developed by the shock wave of an explosion.

All these processes suffer from disadvantages:

The mechanical assembly processes, because of expansion phenomena, result in clearances between members and in oxidation, which is prejudicial to good electrical conductivity;

fusion welding processes are in most cases accompanied by the formation of highly fragile intermetallic compounds;

plating processes require equipment which develop pressures of several hundreds of MPa and are of high cost; in addition, in the particular case of rolling, the assemblies must be made in mass-production manufacture, are poorly suited to partial plating operations, and are generally limited to rectangular sections;

plating processes which use explosions require a difficult and expensive method; moreover, they are used for articles of limited thickness.

It is for this reason that the applicant, seeking to remedy such difficulties, has found and improved a hot pressing assembly process which makes it possible in a rapid and economical manner and with simple equipment to produce an aluminium-steel assembly which enjoys both:

electrical conductivity which is compatible with its use in carrying high-strength currents, mechanical strength of the joint which is equal to that of the aluminium, and good stability in time, as many advantages which are maintained over a temperature range of from at least $-200°$ C. to at least $+450°$ C. and which make this a competitive process.

This hot pressing assembly proces is characterised in that, after the surfaces to be assembled have been prepared by known processes, the surface of the steel member is covered with a metal film, grains of silicon are placed between said surfaces, before pressing, the grains of silicon are protected against oxidation, the members are treated so as to reach at the interface a temperature of from $500°$ to $650°$ C. and a pressure which is sufficient to expel at least a part of the eutectic formed, and, finally, the assembly is cooled.

Thus, the surfaces to be assembled are firstly prepared by using known means so as to make them suitable for applying the process. This comprises putting them into a condition for joining for example by machining and removing the fouling matter which would impair their mutual adhesion, by brushing, sanding, pickling and degreasing.

The first characteristic of the process according to the invention is to cover the assembly surface of the steel member with a metal film. This preliminary metal-plating operation is effected by known methods such as chemical or electrochemical deposit, projection, soaking or vapour phase deposit. The metals used are for example chromium, nickel, silver, gold, tungsten, molybdenum, vanadium and alloys thereof. The covering may be composed of a single metal or may comprise the superposition of a plurality of layers of different metals such as for example chromium and nickel. The covering is preferably from 1 to 3 $\mu$m thick.

This covering is formed in such a way that it limits oxidation before and in the course of heating, acts as a barrier layer to reduce the speed at which fragile intermetallic compounds between aluminium and iron are formed and has a relay-like effect in adhesion of the faces.

A variation in this respect is to omit the step of providing this metal film. In particular, when the member to be assembled comprises an alloy steel for example of a composition such that it forms a barrier layer on its own, it is not necessary in performing this process for this member to be covered, and it can be directly subjected to the deposit of silicon and to the hot pressing treatment. This is the case for example with stainless steel which complies with the designation Z10CN 18-09, in accordance with French standards.

The second characteristic of the process according to the invention is for grains of silicon to be placed between the surfaces to be assembled, before the pressing step. These grains are of varying sizes but are preferably from 30 to 300 $\mu$m and are so disposed as to provide a layer of regular mean thickness at the interface. The thickness of this layer may vary. However, it is preferable for the thickness of the layer to be close to 300 $\mu$m. The grains may be positioned as they are or they may be previously set into any one of the faces to be assembled or into an aluminium sheet or they may be dispersed in a solid or liquid organic material which is volatile below a temperature of 500° C., such as camphor, so as to form a sheet of suitable thickness and of a contour which is similar to and close to that of the faces to be assembled.

By virtue of their hardness and their angular form, under the effect of the pressure applied the silicon grains cause piercing of the layer of oxide which is present on the surface of the aluminium and, facilitating fragmentation thereof, permit the formation of a liquid eutectic with this metal, under the action of the increased temperature, the liquid eutectic being totally or partially expelled when the members to be joined are brought together. Expulsion of the eutectic greatly assists adhesion of the surfaces to each other, as the function thereof is to entrain off the interface any contamination thereon and in particular aluminium oxide particles, thus acting as a cleaning agent.

The third characteristic of the process according to the invention is to protect the surfaces which are to be joined from oxidation, in particular in the heating step and in particular the surface of the steel member, as the silicon does not have the same cleaning action on the steel member as on the aluminium face.

There are several possible ways of combating oxidation which can be employed. One of these ways is to limit gaseous exchanges between the interface and the ambient medium by means of a screen. The screen may be produced:

- by fitting a seal to the periphery of the interface. The seal is preferably of a circular, trapezoidal or triangular cross-section and comprises a material which melts above a temperature of 650° C.; this may be for example tin or arbal, a 95% zinc and 5% aluminium alloy;
- by machining or deforming any one of the faces to be joined, whereby a raised portion which is preferably of triangular or trapezoidal cross-section is produced around its circumference;
- by wrapping the members in the vicinity of the interface in a thin metal sheet, for example a sheet of aluminium which is 70 μm in thickness.

Another possible way of providing protection from oxidation is to perform the assembly operation in a nonoxidising atmosphere which is produced for example by known means such as: hooding, scavenging by inert gas, vacuum or using getters.

Yet another way of providing protection from oxidation is for the members to be rapidly heated, for example using for this purpose induction furnaces and ventilated furnaces instead of static furnaces, so as to produce heating speeds which are preferably higher than 20° C./minute. Moreover, it should be added that the metal covering of the steel part, by virtue of its composition, may also contribute to limiting oxidation, as is the case in particular with chromium.

The fourth characteristic of the invention is to treat the members so that a temperature of from 500° C. to 650° C. and a pressure which is sufficient to expel at least a part of the eutectic formed are achieved at the interface. Raising the interface to the above-specified temperature range results in fusion of the eutectic described in the second characteristic above. The heating which is required for achieving this result may be applied either separately to each of the members to be joined, or to the overall assembly. When the members are heated separately, the assembly surfaces may be at different temperatures.

When the temperature of from 500° C. to 650° C. is reached at the interface, the assembly is put under pressure. As has been seen hereinbefore, the aim of this operation is to move the faces to be joined together and thus to cause the aluminium oxide layer to be pierced by the silicon grains, partial or total expulsion of the eutectic in the liquid condition, and removal of the particles of oxide which impair good adhesion between the members.

The pressing operation is effected at pressure values which may vary within wide limits but which are preferably from 2 to 20 MPa, and the pressure is applied for a period of time which may vary within wide limits but which may be for example less than 1 minute.

In an alternative form of the invention, when the members are heated together, it is possible to apply a pressure before or during the heating operation; this makes it possible to reduce the space between faces to be joined, to improve the sealing effect, and also to engrain the silicon grains in the aluminium surface.

The pressure is produced for example by means of a conventional press.

After using the above-described means, the assembly is then cooled. The cooling operation is preferably performed in two stages: firstly, rapid cooling between the maximum temperature and 450° C., that is to say, at a speed of more than 20° C. per minute, and then slow cooling to a temperature of 200° C.

in an alternative form, a plateau at about 450° C. may be introduced between the two phases of the cooling operation, for the period of an hour.

In the course of the first phase, this procedure makes it possible to limit the formation at the interface of intermetallic compounds whose presence would result in the connection being fragile, while in the course of the above-mentioned plateau and the second phase, this procedure makes it possible to provide a thermal consolidation treatment and to relieve the stresses which are generated by different contraction of the members.

These cooling conditions are achieved by conventional means, for example acceleration by exchange with a fluid, and a reduction in speed by maintaining a slight heating action or by using heat-insulation.

During the cooling operation, a pressure is preferably maintained, which may be lower than the pressure applied during the pressing operation.

The present invention will be better understood from the single FIGURE which shows an aluminium-silicon grain-steel assembly which is disposed in one type of pressing and heating environment. The FIGURE shows a view in cross-section of the pressing means 1 of a press, the path of an inductor 2 which provides for the heating action, a steel member 3 with a covering 4, a seal 5 of triangular section, silicon grains 6 and an aluminium member 7. The orientation of this figure is in no way limiting as pressing may be effected along any direction: vertical, horizontal or inclined.

A series of five examples set forth in the following table illustrate the invention by describing some of the means used and the results achieved.

These results relate to traction tests wherein a comparison is made between the rupture load of the assembly and the rupture load of aluminium 1050, the table indicating if rupture occurred at the interface or in the metal of lesser strength (aluminium), such indications being made both for the assembly in the crude state in which it was produced and in regard to an assembly which had been subsequently subjected to a thermal treatment for a period of 1 hour at a temperature of 560° C. so as to simulate ageing when used under increased temperature conditions.

The results shown also relate to tests involving bending small plates 4 mm in thickness, which had or had not been subjected to a thermal treatment, through a right angle around a radius of 4 mm; the table also in indicates whether or not rupture occurred at the interface.

All these examples, which are not limiting, relate to assembles which are formed on the one hand by members of aluminium type 1050 and on the other hand members of stainless steel of type Z10CN 18-09 for Example 1 and 1008 (in accordance with standard SAE) for the other Examples, this corresponding to an ordinary steel containing less than 0.1% of carbon.

periods of time, the invention makes it possible for only simple heating and compression means to be required in order to produce assemblies which enjoy an excellent degree of adhesion, even after accelerated ageing, which is revealed by resistance to a tensile force and to bending, and electrical conductance, which are good under conditions of use in a continuous manner at temperatures ranging from at least −20° C. to at least +450° C.

These therefore are characteristics which make this process a general, simple, speedy and economical process to which all forms of members can be subjected: plates, sheets, bars, discs and rods of a diameter ranging from 1/10 mm to several decimeters and which are put to use in a wide field, ranging by way of example from the electrical connection between electrolysis vessels and the supply network, to various total or partial plat-

| EXAMPLES No | 1 | 2 | 3 | 4 | 5 |
| --- | --- | --- | --- | --- | --- |
| MATERIALS USED | | | | | |
| Nature of the members | | | | | |
| Aluminium | 1050 | 1050 | 1050 | 1050 | 1050 |
| Steel | Z10CN 18-09 | 1008 | 1008 | 1008 | 1008 |
| Dimension of the members (mm) | | | | | |
| Aluminium | φ 97 thick. 20 | φ 85 thick. 20 | φ 97 thick. 20 | φ 85 thick. 20 | φ 95 thick. 20 |
| Steel | φ 100 thick. 38 | φ 85 thick. 38 | φ 97 thick. 38 | φ 85 thick. 38 | φ 95 thick. 38 |
| Coating steel | none | nickel plating thick.: 2 μm | Chromium plating thick. 0.2–0.3 μm Nickel plating thick. 2–3 μm | Chromium plating thick. 1–2 μm | Chromium plating thick. 1–2 μm |
| Silicon | | | | | |
| layer thick. (mm) | <0.5 | <0.5 | <0.5 | <0.5 | <0.5 |
| granulometry (μm) | 100 to 315 | 100 to 315 | <100 | <100 | <100 |
| PRODUCTION | | | | | |
| Protection from oxidation | screen | screen | screen | screen | screen |
| Heating | | | | | |
| Speed (°C./min) | 50 | 100 | 100 | 100 | 20 |
| Pressure (MPa) | 4 | 3 | 3 | 4 | unknown, mechanical curbing |
| Pressing | | | | | |
| Time (second) | 15 | 5 | 5 | 5 | 3 |
| Pressure (MPa) | 14 | 14 | 14 | 15 | unknown, pressure on stops |
| Cooling to 450° C. | | | | | |
| Time (min) | 7 | 7 | 6 | 6 | 3 |
| Pressure (MPa) | 9 | 9 | 8 | 8 | 0 |
| from 450° C. to 200° C. | | | | | |
| Time (min) | 30 | 30 | 20 | 20 | 6 |
| CHARACTERISTICS | | | | | |
| Traction test: in the crude state | contraction in section in the aluminium | contraction in section in the aluminium | contraction in section in the aluminium | contraction in section in the aluminium | not made |
| after treatment | contraction in section in the aluminium | rupture at the interface | more frequent rupture in aluminium | contraction in section in the aluminium | not made |
| 90° bending test in the crude state | not made | not made | no rupture | frequent rupture | no rupture |
| after treatment | not made | not made | rupture | no rupture | no rupture |

These examples show that the assembly produced can carry loads corresponding to the rupture load of the aluminium member and that, in most case, rupture occurs not at the interface but in the aluminium member itself; in addition, Examples 3, 4 and 5 show that bending through an angle of 90° can be effected on a plate, without there being any rupture at the interface.

Thus, by operating at moderate temperatures and applying relatively low pressures for relatively short ing operations for providing protection or armour plating.

We claim:

1. In an assembly process for the hot pressure bonding of an aluminum-based member and a steel member whose surfaces to be bonded have been cleaned in preparation for bonding, the improvement comprising the steps of: providing a layer of angular grains of silicon in association with at least one of the surfaces to be bonded; protection the silicon and the surfaces to be bonded from oxidation; heating the surfaces to be bonded to a temperature of from about 500° C. to about 650° C.; subjecting the members, with the surfaces to be bonded in interface, to a pressure sufficient for said angular grains of silicon to pierce any aluminum oxide layer present and form an aluminum-silicon eutectic and expel from the interface at least a portion of the eutectic formed by whereby bond impairing contaminant present at the interface is removed by being entrained in the eutectic expelled, said pressure being sufficient to bond the members; and cooling the bonded members to below the eutectic temperature.

2. An assembly process according to claim 1 wherein the surface to be bonded of the steel member is covered with a metal film before the grains of silicon are put in place.

3. An assembly process accordind to claim 2 wherein the metal film forming the covering on the assembly surface of the steel member is a metal selected from the group comprising chromium, nickel, siler, gold, tungsten, molybdenum and vanadium.

4. An assembly process according to claim 1 wherein the grains of silicon are from about 30 to about 300 μm.

5. An assembly process according to claim 1 wherein the grains of silicon are so disposed as to form a layer which is about 300 μm in thickness.

6. An assembly process according to claim 1 wherein the grains of silicon are engrained in any one of the surfaces to be assembled.

7. An assembly process according to claim 1 characterized in that, before the assembly step, the grains of silicon are dispersed in an organic material which is volatile below a temperature of 500° C. so as to form a sheet of suitable thickness and of a contour which is similar to and close to that of the interface.

8. An assembly process according to claim 1 wherein protection from oxidation during bonding is achieved by positioning around the circumference of the interface a gas impermeable barrier.

9. An assembly process according to claim 1 wherein protection from oxidation during bonding is achieved in a non-oxidizing atmosphere.

10. An assembly process according to claim 1 wherein the temperature at the interface is achieved, starting from ambient temperature, at a rate which is greater than about 20° C./minute.

11. An assembly process according to claim 1 wherein during the step to achieve a temperature of from 500° C. to 650° C. at the interface, a pressure between about 2 and about 20 MPa is simultaneously applied.

12. An assembly process according to claim 1 wherein the members to be assembled are heated separately.

13. An assembly process according to claim 1 wherein when the interface is at a temperature of from about 500° C. to about 650° C. there is applied a pressure of from about 2 to about 20 MPa for a period of less than about 1 minute.

14. An assembly process according to claim 1 wherein the cooling is effected to a temperature of about 450° C., at a speed which is higher than about 20° C. per minute.

15. An assembly process according to claim 1 wherein cooling is effected to a temperature of about 450° C. at a rate which is higher than about 20° C. per minute, and is then followed by being maintained at a plateau temperature for a period of about 1 hour at said plateau temperature, before returning to ambient temperature.

16. An assembly process according to claim 1 wherein a pressure no greater that that applied during the pressing step is maintained during the cooling step.

* * * * *